(12) United States Patent
Viaud et al.

(10) Patent No.: US 7,091,425 B2
(45) Date of Patent: Aug. 15, 2006

(54) APPARATUS FOR MEASUREMENT OF THE WEIGHT FORCE OF A BALE

(75) Inventors: Jean Viaud, Gray (FR); Stephane Biziorek, Champlitte (FR); Lionel Guiet, Gray (FR); Mickael Pessard, Daumeray (FR)

(73) Assignee: Deere & Company, Moline, IL (US)

( * ) Notice: Subject to any disclaimer, the term of this patent is extended or adjusted under 35 U.S.C. 154(b) by 152 days.

(21) Appl. No.: 10/847,189

(22) Filed: May 17, 2004

(65) Prior Publication Data

US 2004/0245028 A1  Dec. 9, 2004

(30) Foreign Application Priority Data

May 17, 2003  (DE)  ................ 103 22 333

(51) Int. Cl.
*G01G 19/08* (2006.01)
(52) U.S. Cl. .................. 177/136; 53/502; 53/432; 100/99
(58) Field of Classification Search ................ 177/136; 53/211, 502; 56/432; 100/99
See application file for complete search history.

(56) References Cited

U.S. PATENT DOCUMENTS

| 4,362,097 A | 12/1982 | Rogers |
| 4,742,880 A | 5/1988 | Schrag et al. |
| 5,384,436 A | 1/1995 | Pritchard |
| 5,742,010 A | 4/1998 | Griffin |
| 5,866,855 A | 2/1999 | Nachtigal |
| 6,457,295 B1 * | 10/2002 | Arnold ................ 53/211 |

FOREIGN PATENT DOCUMENTS

| DE | 27 34 562 | 2/1979 |
| DE | 44 36 128 | 9/1994 |
| DE | 195 43 343 | 11/1995 |
| DE | 198 35 163 | 8/1998 |
| DE | 199 10 555 | 3/1999 |
| GB | 973 783 | 10/1964 |

* cited by examiner

*Primary Examiner*—David M. Gray
*Assistant Examiner*—Sean Kayes

(57) ABSTRACT

The invention relates to an apparatus for measurement of the weight force of a bale of crop material after it is formed in a baler. The formed bale is movable in the baler by a conveying device and a weight force measurement device is provided for measuring a measurement parameter which is influenced by the weight force of the formed bale. The measurement device is set up so as to measure the weight force of the bale when the latter is resting on the conveying apparatus.

7 Claims, 4 Drawing Sheets

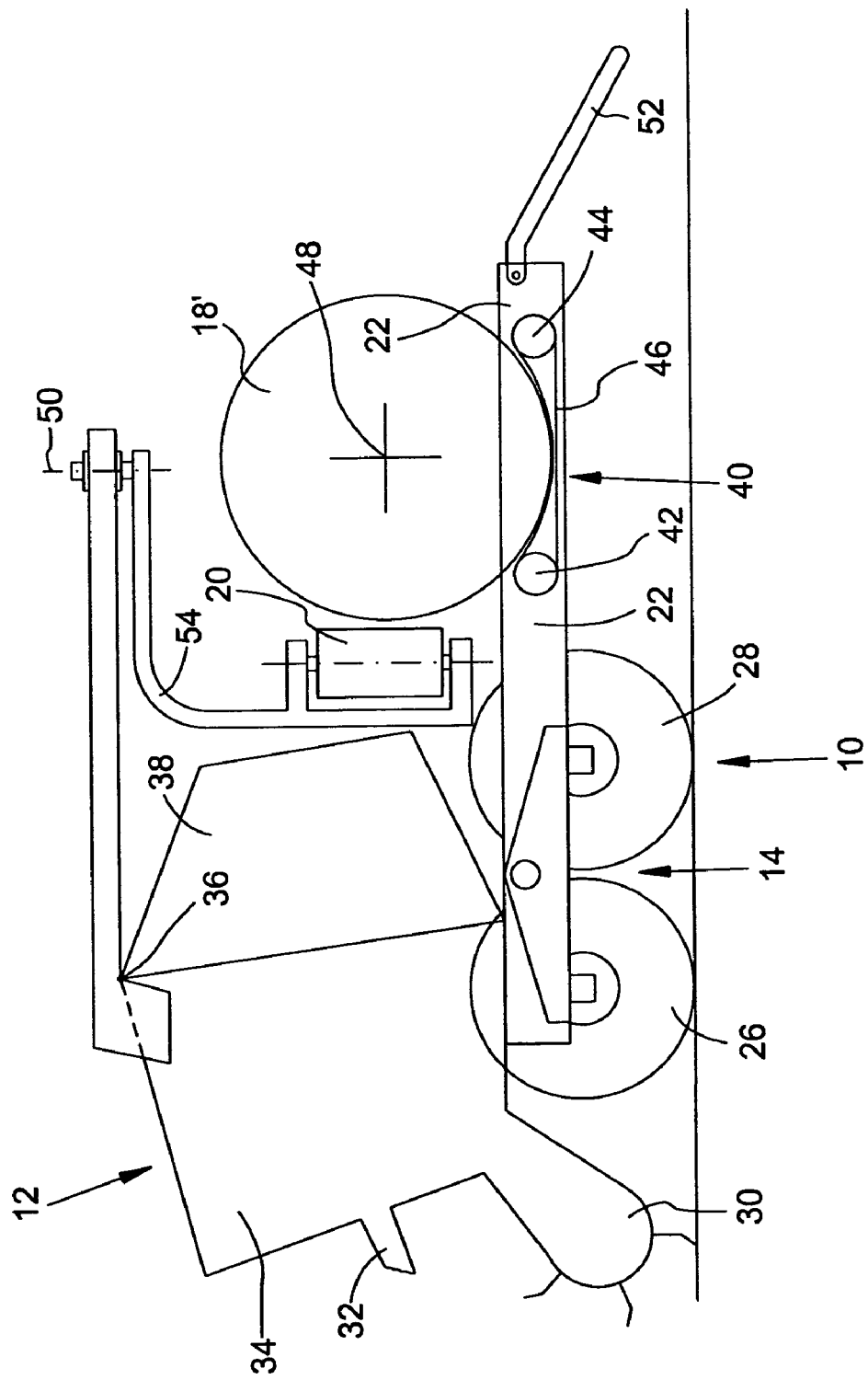

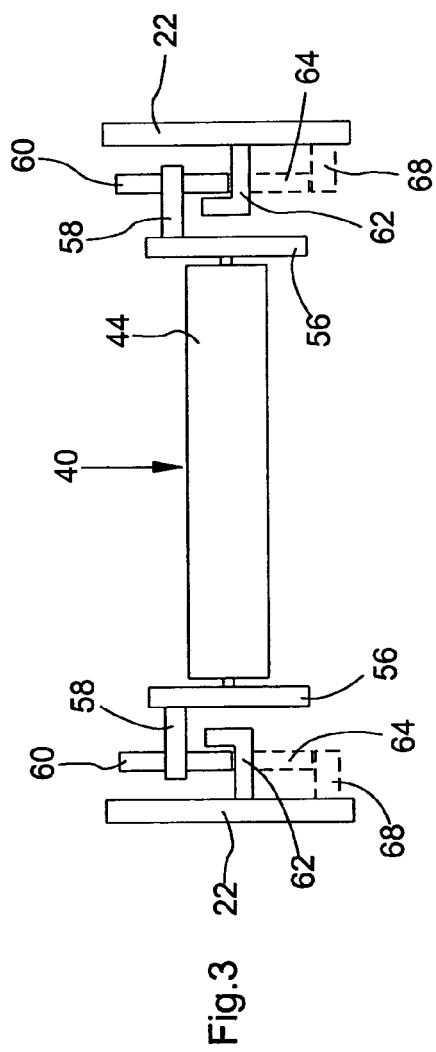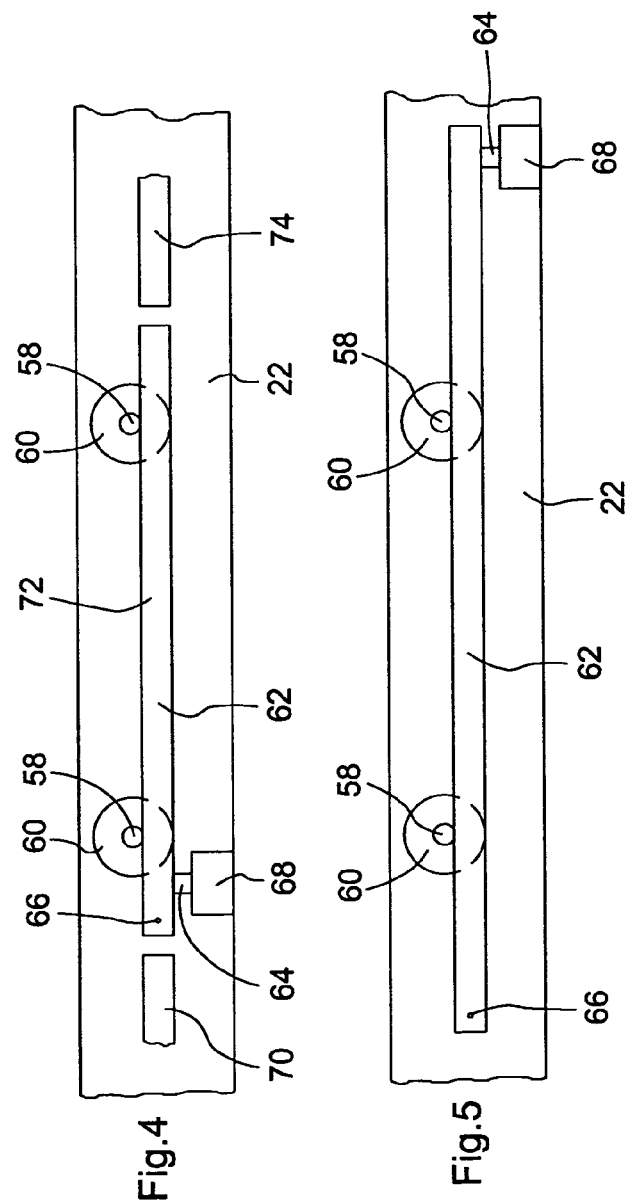

APPARATUS FOR MEASUREMENT OF THE WEIGHT FORCE OF A BALE

FIELD OF THE INVENTION

The invention relates to an apparatus for measurement of the weight force of a bale, in a machine for forming and/or processing of bales, wherewith the bale is movable within the machine by means of a conveying device, and wherewith a measurement device is provided for measuring a measurement parameter which is influenced by the weight force of the bale.

BACKGROUND OF THE INVENTION

In the state of the art, a number of apparatuses for measurement of the weight or mass of a bale comprised of pressed agricultural crop material are known.

For example (DE 44 36 128 A, DE 198 35 163 A, DE 199 10 555 A, U.S. Pat. No. 4,742,880 A, U.S. Pat. No. 5,384, 436 A, and U.S. Pat. No. 5,742,010 A), it has been proposed to convey a fabricated bale out from the press chamber and onto a support surface, where the weight of the bale is measured while the bale is at rest or is moving, the measurement being a measurement of the force exerted on the support surface. Because a bale is relatively heavy, bringing it to a complete stop requires substantial effort. However, if one attempts to measure the weight force while the bale is moving, the process is subject to substantial measurement error.

In DE 195 43 343 A, it was proposed to measure the weight forces acting on the axles and the tow-bar of a baling press. The weight force of the fabricated bale is calculated based on the change in the forces when a bale is ejected. In order to obtain usable measurement values with this approach, a large number of sensors and a highly developed calculation scheme are required.

SUMMARY OF THE INVENTION

The underlying problem of the present invention is expressed as to devise a simple and reliable apparatus for measurement of the weight force of a bale, which apparatus does not have the abovementioned drawbacks or has them only to a lesser degree.

This problem is solved according to the invention by the provision of a machine for forming and/or processing bales and including a conveying device for conveying the bales. It is proposed that a measurement device be provided which measures the weight force of a bale disposed on the conveying apparatus. Thus, an already present conveying apparatus is utilized in the measurement of the weight force of the bale. The measurement device can be disposed at a relatively protected location in/on the machine.

The type of conveying apparatus may be arbitrarily selected. It may involve a carriage bearing a bale or bales, which carriage moves by its own drive means or via an external drive means, such as a linkage or rod. Or any other type of driven conveyor may be employed, which may have, e.g., a gripper, hook, conveyor belt, or conveyor rollers. The conveying apparatus may be actively driven, or conveying of the bales may occur solely via gravity if a sufficient height differential is provided.

Preferably, the conveying apparatus is supported by support elements, on a support means or support structure which is joined to the machine. The support elements move with the conveying apparatus along the support structure, e.g., via rolling means. The measurement device is disposed between the support structure and the machine proper, e.g., it is disposed on the frame or undercarriage of the machine. Accordingly, the measurement device produces information about the weight force of the conveying apparatus as well as the bale located on the conveying apparatus. The weight force of the conveying apparatus is known or can be measured. Thus, the weight force of the bale can be ascertained by suitable computation. It is advantageous that it is unnecessary for the measurement apparatus to move along with the conveying apparatus. This facilitates data transfer from the measurement apparatus to an evaluation, memory and/or display apparatus which evaluation, memory, and/or display apparatus does not move along with the conveying apparatus.

In a preferred embodiment, the support structure, or a partial region of the support structure which cooperates with the measurement device, extends over only a part of the region of movement of the conveying apparatus. The weight force of the conveying apparatus with the bale present on the conveying apparatus is thus measured during the conveying. The conveying apparatus can be stopped for the measurement or can continue in movement during the measurement. In another embodiment, the support structure extends over the entire region of movement of the conveying apparatus.

The measurement device can be set up to directly measure the weight force exerted by the conveying apparatus and the bale present thereon. For this purpose, force measurement cells may be provided on both ends of the support structure, or at any position between the ends.

Alternatively, the measurement device may measure the rotational moment generated by the conveying apparatus and the bale present on the conveying apparatus. For this purpose, the support structure may be swingably mounted to the machine so as to be swingable around a horizontal axis which as a rule extend transversely to the direction of travel and/or the direction of movement of the conveying apparatus. The measurement device is disposed at a distance from the swing axis, namely between the support structure and the machine frame. The measurement of the rotational moment allows reducing the number of force measurement cells employed. Thus, a single measurement cell can suffice, if the support elements on both sides of the conveying apparatus are rigidly interconnected.

Machines which can advantageously employ the inventive apparatus include machines for producing and/or processing of bales, such as a combination bale press and bale-wrapping machine. In such a machine, the conveying apparatus is set up so as to transport the bale from the press chamber in which the bale is formed to the wrapping position in which a wrapping is applied around the bale.

BRIEF DESCRIPTION OF THE DRAWINGS

Three exemplary embodiments of the invention, which will be described in more detail herein below, are illustrated in the drawings.

FIG. 2 is a view of the machine according to FIG. 1, wherein the conveying apparatus is in a bale-wrapping position.

FIG. 3 is a cross section through the machine along the line 3—3 of FIG. 1, illustrating the support of the conveying apparatus on the frame of the machine.

FIG. 4 is a schematic side view of the support of the conveying apparatus on the frame of the machine, with a first embodiment of the measurement apparatus.

FIG. 5 is a schematic side view of the support of the conveying apparatus on the frame of the machine with a second embodiment of the measurement apparatus.

DESCRIPTION OF THE PREFERRED EMBODIMENT

Figure 1:
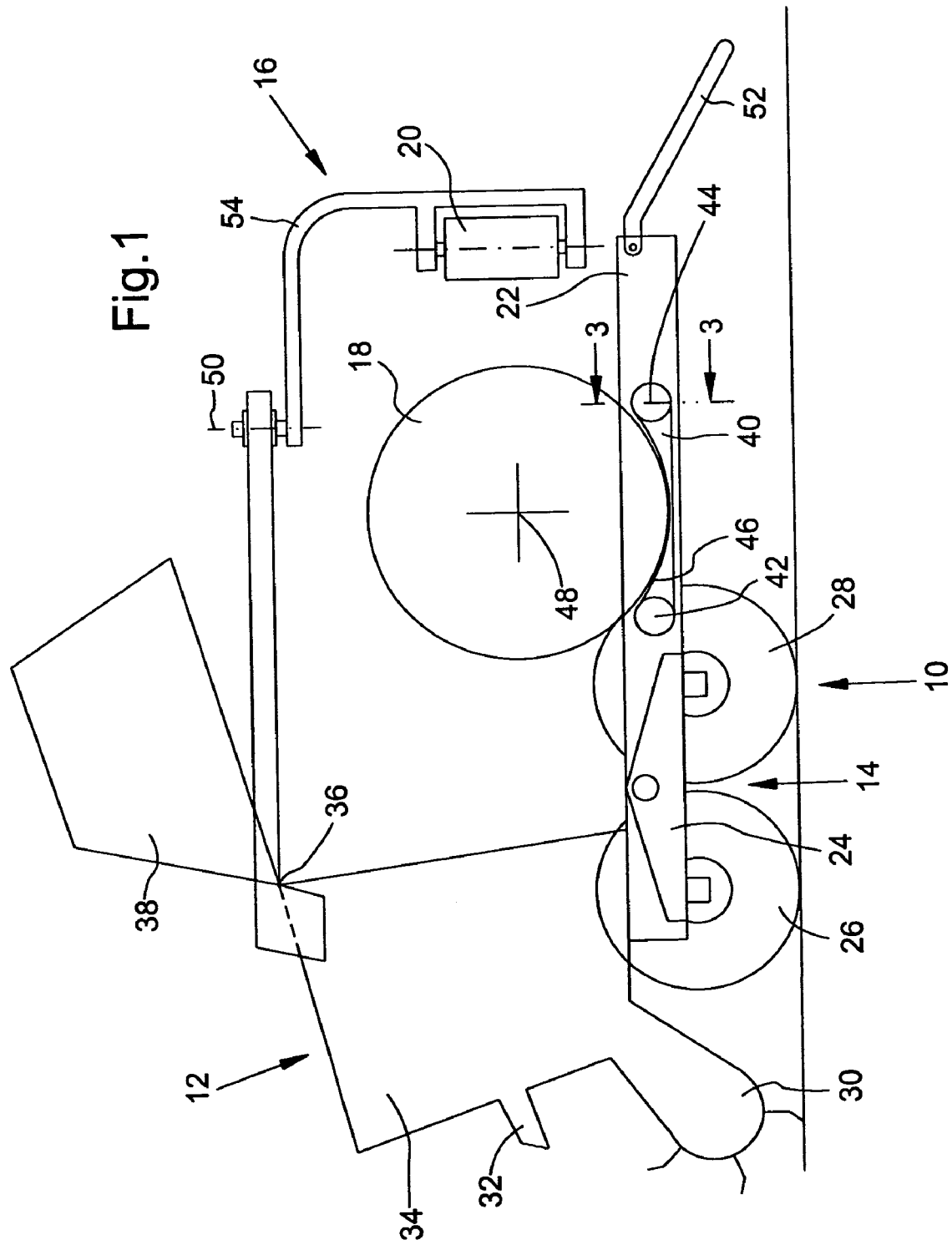
FIG. 1 is a schematic left side view of a machine for the producing and wrapping of bales, which is provided with an inventive apparatus for measurement of the weight force of bales, wherein the conveying apparatus is in a position for receiving a bale.

Referring now to FIG. 1, there is shown a machine 10 for the producing and wrapping of bales, which is comprised of a press 12 for forming large cylindrical bales and including an undercarriage 14, which undercarriage 14 also bears a wrapping apparatus 16 for wrapping of cylindrical bales 18 with film material 20. The undercarriage 14 has, on both sides of the machine 10, two longitudinal beams 22 which extend in the direction of forward travel of the machine 10. A tandem axle 24 is disposed in the forward region of the longitudinal beams 22, which tandem axle is supported on a pair of front wheels 26 and a pair of rear wheels 28. The machine 10 is connected to a tractor by a tow-bar 32 whereby the machine is pulled over a field.

The round bale press is of a construction which is per se known, and is capable of producing bales from agricultural crop material which is fed to the press 12 via a pick-up 30. The round bale press 12 has a forward housing part 34 which is fixedly attached to the machine frame 14 and a rear housing part 38 which is swingable around an upper swing axis 36. When the rear housing part 38 is in a lowered working position, it cooperates with the fixed housing part 34 to define a variable or constant press space (not illustrated) for producing large cylindrical bales. In FIG. 1, the rear housing part 38 is shown in its up-swung position for discharging a completed bale 18.

The bale 18 produced by the round bale press 12 rolls backward, on suitable elements, from the forward housing part 34 and arrives at a conveying apparatus 40 which comprises a forward roll 42 and a rear roll 44 which support a plurality of side-by-side disposed conveyor belts 46. The bale 18 rests on the belts 46. The conveying apparatus 40 is movable as a whole between a bale-receiving position, shown in FIG. 1, and a bale-wrapping position, shown in FIG. 2.

When the bale 18' is in the bale-wrapping position, shown in FIG. 2, it is rotated around its cylindrical axis 48 by means of the conveying apparatus 40, by rotational driving of the rolls 42 and 44 by suitable motors, in a known fashion. In this way, the bale 18' is wrapped with film 20 by means of a spool which is mounted on an arm 54 and is swingable, e.g., in an arc, around a vertical axis 50. In order to prevent the film-wrapped bale 18' from falling onto the ground from the relatively substantial height of the conveying apparatus 40 when it is released from the conveying apparatus, the bale 18' is then rolled onto the ground via an off-rolling device 52. When the rear housing part 38 of the baling press is being swung upward, the arm 54 is rotated rearward, as shown in FIG. 1, in order to be out of the way.

The manner of mounting of the conveying apparatus 40 on the longitudinal beams 22 is shown in detail in FIG. 3, which shows a cross section along line 3—3 of FIG. 1. The rolls 42 and 44 are rotatably mounted on support members 56 which extend parallel to the beams 22. The two support members 56, 56 are joined together by cross beams (not shown), and bear four axles 58 (see also FIGS. 4 and 5) which extend horizontally outward, which bear support elements in the form of rotatable wheels 60. Alternatively, the support elements 60 can be rigidly fixed to the axles 58 which can in turn be rotatably connected to the support members 56. On the internal sides of the longitudinal beams 22, support structures 62 are mounted which have a high-angle profile. The support elements 60 roll on the support structures 62.

The movement of the conveying apparatus 40 between the position illustrated in FIG. 1 and that illustrated in FIG. 2 can be accomplished by a hydraulic cylinder or another motor (neither is shown). For this purpose, one might consider a rotational drive for the support elements 60. The rolls 42 and 44 can be driven by a hydraulic motor or the like mounted on the support members 56. One might also consider embodiments of the machine 10 wherein it is unnecessary to have a rotary drive means for the rollers 42 and 44.

FIG. 4 shows a first embodiment of a measurement device 64 for measuring the weight force (mass) of the bale 18. The support structures 62 are divided into a forward partial region 70, upstream of a middle partial region 72, and a rearward partial region 74 downstream of the region 72. The forward and rearward partial regions 70 and 74, respectively, of the support structures 62 are rigidly attached to the longitudinal beams 22.

The middle partial region 72 of the support structures 62 has a length which is slightly greater than the distance between the axles 58, and on a first end, forward or rearward, is swingably mounted to the longitudinal beam 22 so as to be swingable around a swing axle 66 which extends horizontally, and perpendicularly to the direction of travel. Alternative, the middle partial region 72 may be freely movable. Via the measurement device 64, the middle partial region 72 is supported against a console 68 which extends inwardly from the longitudinal beam 22. When both support elements 60 of the conveying apparatus 40 are disposed over the support structures 62 of the middle partial region 72, they exert a rotational moment on the support structures 62 which gives rise to a force in the measurement device 64 which is measured by the measurement device 64, and the measurement signal is communicated to an evaluation device (not shown). By comparison with the measurement value of an empty conveying apparatus 40, the weight force of the bale 18 can be ascertained.

The evaluation device can also receive a measurement value from a sensor which determines the position of the conveying apparatus 40 or which generates a signal when said apparatus 40 reaches a predetermined position, so as to provide information as to which position on the support structures 62 is being occupied by the conveying apparatus 40. This information can also be deduced from the signals from the measurement device 64. The conveying apparatus 40 can be stopped for measurement, wherewith in order to improve the measurement accuracy when the machine is traveling over uneven terrain the measurement values can be taken over a relatively long period of time and can be averaged. Alternatively, the conveying apparatus 40 can be continuously in motion, and measurement values taken versus time and stored, preferably in combination with the abovementioned information about the position of the conveying apparatus, can be used to computationally ascertain the weight force. In this manner, the weight force of the bale 18 is found. Preferably, the weight force value is displayed in the cabin of the tractor by display means, and is stored in a portable memory device.

The measurement device 64 may be disposed in a protective housing, along with the support means, bearings or the like, of the support structures 62 on the swing axle 66, because these are all disposed relatively close to the swing axle 66. In an alternative embodiment, the measurement device 64 may be disposed on the end of the support structures 62 which is away from the swing axle 66.

FIG. 5 shows the mounting of the measurement device 64 in a different embodiment of the invention. Here the support structure 62 extends over the entire region of movement of the conveying apparatus 40. The support structure 62, at its forward or rearward end, is swingably attached to the longitudinal beams 22 so as to be swingable around the horizontal swing axle 66 which extends horizontally, and perpendicularly to the direction of travel. At its opposite end, or any other position along its length, the support structure 62 is disposed above and rests against the measurement device 64 and, in turn, the console 68 on the longitudinal beam 22. In this embodiment as well, the measurement device 64 measures the rotational moment generated by the conveying apparatus 40 and the weight force of the bale 18. Further evaluation can be carried out as described above relative to the previously described embodiment.

In the two described and illustrated embodiments, it is possible to have measurement devices 64 at both ends of the support structure or structures 62, in order to measure the weight force, rather than the rotational moment, of the conveying apparatus 40 and the bale 18 disposed on the conveying apparatus.

Figure 6:
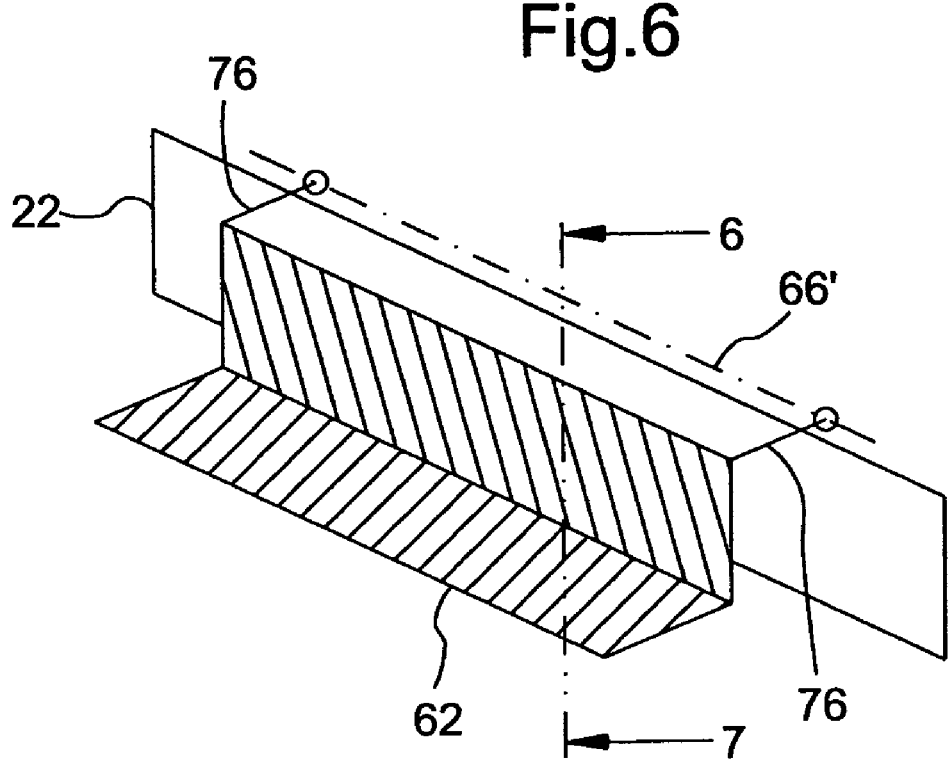
FIG. 6 is a perspective view of the support of the conveying apparatus on the frame of the machine, with a third embodiment of the measurement apparatus.
Figure 7:
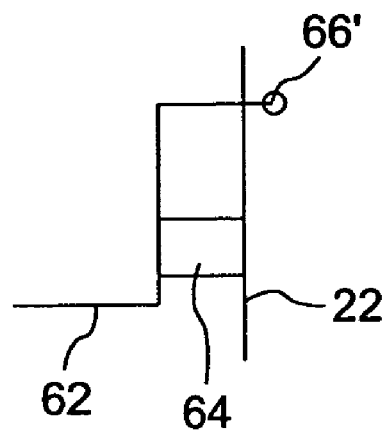
FIG. 7 is a cross section through the support according to FIG. 6, along line 7—7.

Finally, FIGS. 6 and 7 illustrate a third embodiment of the mounting of the measurement device 64. The support structure 62 is swingably connected to the longitudinal beam 22 so as to be swingable around a horizontal swing axis 66' which extends in the direction of travel, which is the longitudinal direction of the longitudinal beam 22. The support structure 62 has a right angle configuration and has a lower horizontal shelf which extends inwardly from the longitudinal beam 22, and further has a vertical leg which extends upward from the outer side of the horizontal shelf, which vertical leg in turn is swingably connected to the longitudinal beam 22 via connecting elements 76, 76 so as to be swingable around the swing axis 66'. The measurement device 64 is disposed between the vertical leg and the longitudinal beam 22. The measurement device 64 measures the rotational moment which the conveying apparatus 40, together with the carried bale 18, exerts on the support structure 62. The support structure 62 may extend over the entire length of the region of movement of the conveying apparatus 40, or over a part of the region.

As a rule, support structures 62 having a measurement device 64 are disposed on the longitudinal beams 22 at both sides of the vehicle so as to be able to avoid measurement errors which occur as a result of the lateral suspension configurations. On might also consider mechanically interconnecting the support structures 62 on the two sides of the machine 10, e.g., by a sufficiently wide lower crossbeam, which enables the conveying apparatus to be driven over the cross beam. With this arrangement, only a single measuring cell would be required for the measurement device 64. Another means of minimizing measurement error would be to provide separate inclination sensors which function along the direction of travel and/or in the transverse direction.

Having described the preferred embodiment, it will become apparent that various modifications can be made without departing from the scope of the invention as defined in the accompanying claims.

The invention claimed is:

1. In a combination of a baler for forming and processing bales including an apparatus for wrapping bales and including a conveying apparatus for moving a formed bale, the conveying apparatus being movable between a position for receiving a formed bale and a position wherein the formed bale is wrapped by the apparatus for wrapping bales and a measurement apparatus for use in determining the weight force of the formed bale, with the measurement apparatus being capable of measuring a parameter which is influenced by the weight force of the formed bale, the improvement comprising: said measurement apparatus being set up so as to measure the weight force of the formed bale when the latter is resting on said conveying apparatus.

2. The combination, as defined in claim 1, wherein said conveying apparatus is one of a carriage, a movable linkage equipped with a bale-holding gripper or hook, a belt conveyor, or a roller conveyor.

3. The combination, as defined in claim 1, wherein a support structure is provided in the baler; and support elements mounting said conveying apparatus to said support structure and mounted for moving with said conveying apparatus relative to said support structure; and said measurement device being disposed between said support structure and said baler.

4. The combination, as defined in claim 3, wherein said support structure extends over only a partial region of a region of movement of said conveying apparatus.

5. The combination, as defined in claim 3, wherein said support structure extends over an entire region of a region of movement of said conveying apparatus.

6. The combination, as defined in claim 3, wherein said measurement device is set up so as to measure the weight force exerted on said support structure by said conveying apparatus and said formed bale located on said conveying apparatus.

7. The combination, as defined in claim 3, wherein said support structure is mounted to said baler for swinging about a horizontal axis; and said measurement device being set up so as to measure a rotational moment exerted on said support structure by said conveying apparatus and said formed bale located on said conveying apparatus.

* * * * *